US008605597B2

(12) United States Patent
Hong et al.

(10) Patent No.: US 8,605,597 B2
(45) Date of Patent: *Dec. 10, 2013

(54) METHOD AND APPARATUS PERTAINING TO THE ASSESSMENT OF MOBILE COMMUNICATIONS NETWORK INFRASTRUCTURE LATENCY THROUGH HIGH-SPEED CHANNELS

(71) Applicant: Velocent Systems Incorporated, Naperville, IL (US)

(72) Inventors: Tengywe Eric Hong, Naperville, IL (US); Jagadeesh Dantuluri, Aurora, IL (US)

(73) Assignee: Velocent Systems Incorporated, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/788,364

(22) Filed: Mar. 7, 2013

(65) Prior Publication Data

US 2013/0188496 A1    Jul. 25, 2013

Related U.S. Application Data

(63) Continuation-in-part of application No. 13/576,310, filed as application No. PCT/US2011/040487 on Jun. 15, 2011, now Pat. No. 8,462,659.

(60) Provisional application No. 61/354,996, filed on Jun. 15, 2010.

(51) Int. Cl.
    *H04W 24/00*      (2009.01)

(52) U.S. Cl.
    USPC ........................................................ 370/241

(58) Field of Classification Search
    USPC ........................................................ 370/241
    See application file for complete search history.

(56) References Cited

U.S. PATENT DOCUMENTS

| | | | |
|---|---|---|---|
| 6,292,166 B1 * | 9/2001 | Palmer et al. | 345/589 |
| 2001/0041566 A1 | 11/2001 | Xanthos et al. | |
| 2005/0286432 A1 * | 12/2005 | Yasuie et al. | 370/244 |
| 2006/0056300 A1 * | 3/2006 | Tamura et al. | 370/235 |
| 2008/0005156 A1 | 1/2008 | Edwards et al. | |

(Continued)

OTHER PUBLICATIONS

Kim, Hyeon Jin; Authorized Officer; International Search Report and Written Opinion from related Application No. PCT/US2011/040487 dated Feb. 9, 2012; 9 pages.

*Primary Examiner* — Sulaiman Nooristany
(74) *Attorney, Agent, or Firm* — Fitch, Even, Tabin & Flannery LLP (57) ABSTRACT

A network monitoring apparatus in a mobile communications network monitors, for a predetermined time, TCP packets in the network that tend to comprise end-user traffic using the high-speed data path but not the low-speed data path to provide monitored packet information. The network monitoring apparatus uses this monitored packet information to identify the fastest end user-experienced communication exchanges within the mobile communications network. By one approach, the network monitoring apparatus effectively filters out most or all of the end-user traffic that uses the low-speed data path when providing that monitored packet information. This can comprise, for example, tending to utilize data pertaining to TCP packets that correspond to higher traffic volume (and hence that are likely being conveyed via a high-speed data path) while also tending to discard data that pertains to TCP packets to that correspond to low traffic volume (and hence that are likely being conveyed via a low-speed data path).

23 Claims, 7 Drawing Sheets

(56) References Cited

U.S. PATENT DOCUMENTS

| | | |
|---|---|---|
| 2009/0016226 A1 | 1/2009 | LaVigne et al. |
| 2010/0054123 A1* | 3/2010 | Yong .............................. 370/230 |
| 2011/0013569 A1* | 1/2011 | Scherzer et al. ............... 370/329 |
| 2011/0029632 A1* | 2/2011 | Siemens ....................... 709/206 |
| 2012/0137019 A1* | 5/2012 | Kotecha et al. ................ 709/233 |
| 2012/0294231 A1* | 11/2012 | Finlow-Bates et al. ....... 370/328 |

* cited by examiner

METHOD AND APPARATUS PERTAINING TO THE ASSESSMENT OF MOBILE COMMUNICATIONS NETWORK INFRASTRUCTURE LATENCY THROUGH HIGH-SPEED CHANNELS

RELATED APPLICATION(S)

This is a continuation of U.S. patent application Ser. No. 13/576,310, Filed Jul. 31, 2012, entitled Method and Apparatus Pertaining to the Assessment of Mobile Communications Network Infrastructure Latency Through High-Speed Channels, which is a 371 application of PCT/US2011/0404987; Filed Jun. 15, 2011, entitled Method and Apparatus Pertaining to the Assessment of Mobile Communications Network Infrastructure Latency Through High-Speed Channels, which claims the benefit of U.S. Provisional application No. 61/354,996, filed Jun. 15, 2010, which is incorporated by reference in its entirety herein.

TECHNICAL FIELD

This invention relates generally to the assessment of packet-based network performance in a mobile communications network.

BACKGROUND

Packet-based communications networks are known in the art. This includes mobile communications networks that provide communication services to mobile end users (such as, but not limited to, cellular telephone end users). Such networks often have a complicated architecture that can make it difficult to genuinely assess the performance experience for these end users that is attributable to the underlying network infrastructure.

Some prior art systems employ latency or round-trip-time (RTT) monitoring systems to measure network traffic delay. Some known approaches use active Internet Control Message Protocol (ICMP) probes while others employ passive average TCP Round-Trip Latency probes to measure network traffic delay (where the "delay" includes network buffering delays as well as device/service buffering delays). A typical algorithm in these regards measures artificially-generated ICMP ping RTT to and from a pre-defined Internet Protocol (IP) server with known delay. Unfortunately, as ascertained by the applicant, such approaches typically do not provide complete coverage of the mobile communications network nor have an ability to measure the network latency actually experienced by each subscriber for each communication session. In addition, the typical average TCP RTT measurements in the prior art contain both low-speed channel and high-speed channel delays and this tends to skew the latency results and obscure the latency for the underlying network infrastructure delay due to long route, mis-configured route, or long network infrastructure delays attributable to faulty equipment.

BRIEF DESCRIPTION OF THE DRAWINGS

The above needs are at least partially met through provision of the method and apparatus pertaining to mobile communications network latency assessment described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these various embodiments presume use with a mobile communications network that uses both low-speed data paths and high-speed data paths to service the end users of the network. Low-speed data paths often serve to support both system overhead signaling as well as relatively-small data payloads (such as, for example, small data messages). High-speed data paths, in turn, often serve to convey larger data payloads (such as, for example, larger images, video, and audio content).

Pursuant to these teachings, a network monitoring apparatus in the mobile communications network monitors, for a predetermined time, Transmission Control Protocol (TCP) packets in the mobile communications network that tend to comprise end-user traffic using the high-speed data path but not the low-speed data path to provide monitored packet information. The network monitoring apparatus then uses this monitored packet information to identify the fastest end user-experienced communication exchanges within the mobile communications network.

By one approach, the network monitoring apparatus effectively filters out most or all of the end-user traffic that uses the low-speed data path when providing that monitored packet information. This can comprise, for example, tending to utilize data pertaining to TCP packets that correspond to higher traffic volume (and hence that are likely being conveyed via a high-speed data path) while also tending to discard data that pertains to TCP packets to that correspond to low traffic volume (and hence that are likely being conveyed via a low-speed data path).

By one approach the network monitoring apparatus repeats the foregoing over a series of such predetermined-time intervals to provide a corresponding plurality of RTT-related metrics. This information can be processed to provide one or more latency metrics that characterize at least one minimal round-trip latency within the mobile communications network. Such latency metrics can, in turn, be aggregated as desired. By one approach this can comprise aggregating the latency metrics on a service component-by-service component basis to facilitate identifying particular service components that unduly contribute to lengthening of the fastest end user-experienced communication exchanges.

These teachings facilitate finding the fastest network delay experienced by the user which does not always necessarily correspond to the minimum network path. For example, a network path could represent a misrouting and yet these teachings will facilitate measuring the fastest latency using that misrouted path. This, of course, differs considerably from typical approaches in these regards that utilize TCP-based measurements that include average network latency (and hence often include network buffering delays as well as device and server buffering delays). So configured, the network monitoring apparatus identifies these fastest user-experienced communication exchanges within the mobile communications network and employs these minimum-latency examples to develop corresponding measurements. As one benefit, this approach minimizes experiential distortion that is due to mobile or server serialization delay rather than to the performance of the network itself. This, in turn, contributes to greater accuracy with respect to the network's contribution to the end user's actual experience and can greatly facilitate identifying service components that exhibit strange behavior (such as, but not limited to, misrouting, misconfigured routes, unusually-longer routes, and so forth).

Typical prior art approaches measures network traffic latency that includes delays incurred by network buffering and congestion as well as device packet buffering (serialization). The teachings described herein, however, avoid measuring those delays and measures instead the basic network infrastructure latency (and typically only in mobile high-speed channels) and hence focuses on the minimum network infrastructure delay of the underlying network technology.

This performance and these insights are gained without requiring the use of active pinging or probes. Furthermore, these approaches provide a considerably more complete view of both the performance of the overall network as well as the actual experiences of the end users.

Figure 1:
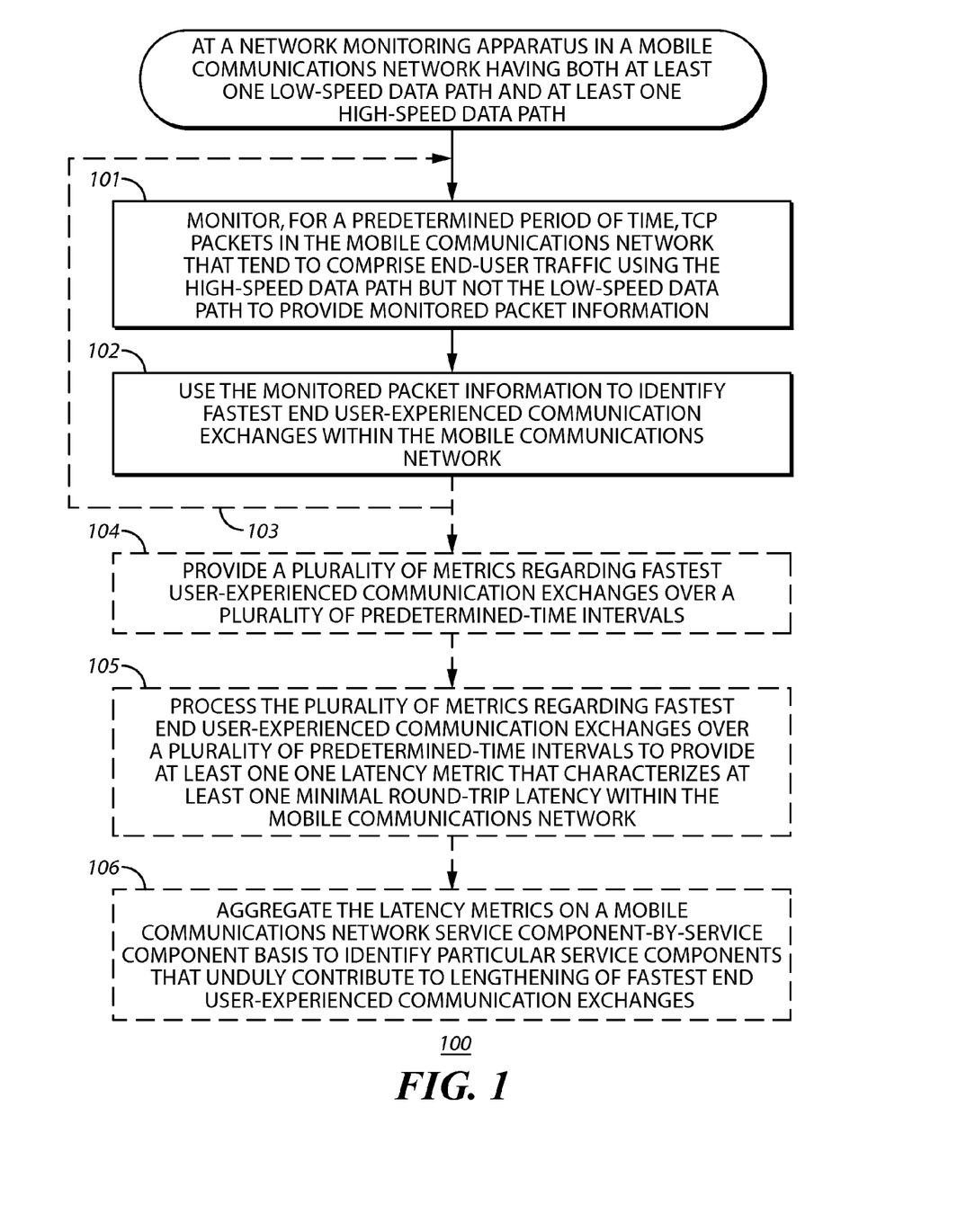
FIG. 1 comprises a flow diagram as configured in accordance with various embodiments of the invention.

These and other benefits may become clearer upon making a thorough review and study of the following detailed description. Referring now to the drawings, and in particular to FIG. 1, an illustrative process 100 that is compatible with many of these teachings will now be presented. As noted above, a network monitoring apparatus in a mobile communications network can carry out the described functionality. For the purposes of this description it is presumed that this mobile communications network has both one or more low-speed data paths and one or more high-speed data paths.

Figure 2:
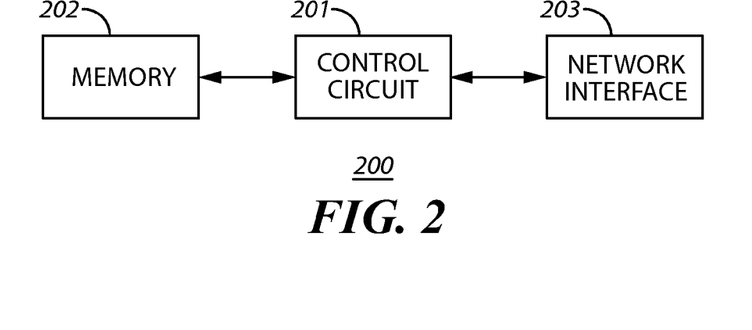
FIG. 2 comprises a block diagram as configured in accordance with various embodiments of the invention.

Referring momentarily to FIG. 2, this network monitoring apparatus 200 can comprise a control circuit 201 that operably couples to a memory 202 and a network interface 203. Such a control circuit 201 can comprise a fixed-purpose hard-wired platform or can comprise a partially or wholly programmable platform. Such architectural options are well known and understood in the art. The memory 202 can serve, for example, to store some or all of the monitored, processed, and/or aggregated metrics described herein. When the control circuit 201 comprises a partially or wholly-programmable platform, this memory 202 can also serve to store part or all of the control-circuit programming. The control circuit 201 itself is configured to carry out one or more of the steps, actions, and/or functions described herein as desired. The network interface 203, in turn, is configured to permit the network monitoring apparatus 200 to carry out the network-based interfacing described herein.

Figure 3:
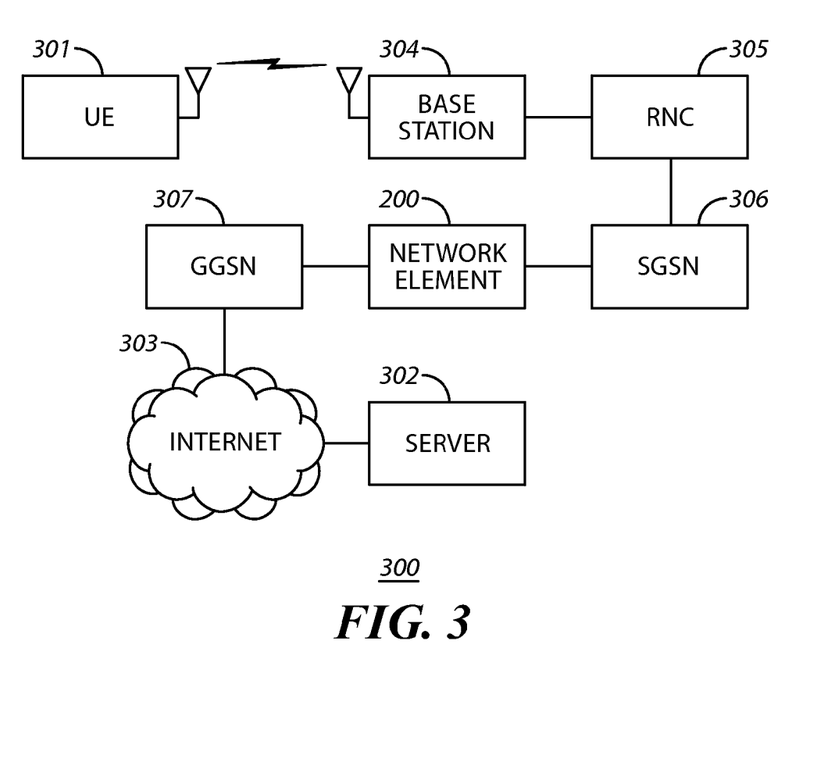
FIG. 3 comprises a block diagram as configured in accordance with various embodiments of the invention.

For the sake of providing an illustrative example and without intending any particular limitations by way of such specificity, FIG. 3 depicts the network monitoring apparatus 200 as deployed within a given mobile communications network 300. The simple illustration that comprises FIG. 3, taken literally, suggests that the network monitoring apparatus 200 is in-line with a network path. These teachings can in fact be so employed. For many application settings, however, it may be preferable to deploy the network monitoring apparatus 200 as not being in-line with a network path. In that case the network monitoring apparatus 200 can be configured to receive, for example, a copy (such as a mirrored copy) of the packet traffic to thereby permit the network monitoring apparatus 200 to carry out the functionality described herein without contributing to packet delay.

This network 300 serves to communicatively couple an end user 301 to a server 302 (the latter coupling to the mobile communications network 300 via, for example, the Internet 303). In this example the mobile communications network 300 includes a base station 304, a radio-network controller (RNC) 305, a (SGSN) 306, and a (GGSN) 307. In such a case, the mobile communications network 300 includes a high-speed and low-speed data path at least in the air interface between the end user 301 and the base station 304.

These teachings permit essentially bypassing the latency of the low-speed data path as well as end user packet serialization delay. By one approach this can comprise monitoring a server's downlink TCP packets to an end user 301 and the end user's returned TCP acknowledgements to thereby obtain a corresponding RTT for a path that begins at the monitoring point with the server's downlink TCP packet and that continues through the SGSN 306, the RNC 305, the base station 304, and the end user 301, and that continues with the end user's acknowledgement packet through the base station 304, the RNC 305, and the SGSN 306 to the monitoring point These service components are well understood in the art and require no further elaboration here. It will also be understood that a given mobile communications network will often include more than one of these components (for example, a typical such network will include a great number of base stations). It will be further understood that a given mobile communications network will often include other components not shown in this illustrative example. These various omissions are undertaken here for the sake of clarity and simplicity. In fact, the present teachings are relevant to and usable with a mobile communications network that is characterized by much greater architectural complexity.

These teachings will accommodate using a significant number of network monitoring apparatuses 200 to carry out activities described herein. By one approach, however, these teachings will also accommodate locating the described functionality at a point of high packet aggregation in the mobile communication network 300. The illustration of FIG. 3 depicts such an approach by depicting the network monitoring apparatus 200 as being located between the GGSN 307 and the SGSN 306. As noted earlier, the network monitoring apparatus 200 can be placed in-line with the network's data path or can comprise a non-in-line component that receives, for example, mirrored traffic. It should also be understood that the illustration of FIG. 3 can be viewed as representing a physical construct (in which case the network monitoring apparatus 200 comprises a distinct and discrete physicallyseparate component) or as representing a logical construct (in which case the network monitoring apparatus 200 can comprise a part, for example, of the GGSN 307) as desired. By locating this capability at a high point of packet aggregation, the number of network monitoring apparatuses can be considerably reduced. In many cases a single such network monitoring apparatus 200 may accommodate the monitoring needs of an entire mobile communications network 300.

Referring again to FIG. 1, at step 101 this process 100 monitors, for a predetermined period of time, TCP packets in the mobile communications network that tend to comprise end-user traffic using the high-speed data path but not the low-speed data path to provide monitored packet information. This predetermined period of time comprises a period of time that is determined in advance of the time of need and will typically comprise a parameter that is set, for example, by the manufacturer and/or a system administrator. By one approach the network monitoring apparatus may have only a single predetermined period of time to use in these regards. By another approach the network monitoring apparatus may have a plurality of such periods from which one may select. The duration of the period of time can vary with the application setting. In a typical application setting a useful duration for the predetermined period can range from at least about three minutes to no more than about fifteen minutes.

There are various kinds of TCP packets known in the art. By one approach, the monitored TCP packets can include both synchronization-acknowledgement TCP packets as well as data-acknowledgement TCP packets.

This step 101 can comprise, by one approach, filtering out end-user traffic that uses the low-speed data path when providing the monitored packet information. This approach, in turn, can comprise monitoring TCP packets that use the high-speed data path as well as TCP packets that use the low-speed data path to provide initially-monitored data packets and then processing these initially-monitored data packets to tend to retain the TCP packets that use the high-speed data path while tending to discard the TCP packets that tend to use the low-speed data path to thereby provide the aforementioned monitored packet information.

By one approach, this can comprise processing the initially-monitored data packets with respect to each measurement period's shortest round-trip time based on that period's volume such that only TCP packets that correspond to higher traffic volume tend to be retained. Using this approach, relatively lower-volume traffic TCP packets are ignored. Since low-volume traffic TCP packets are considerably more likely to be TCP packets that were conveyed via the low-speed data path, this practice will tend to filter out those low-speed data path TCP packets in favor of higher-volume (and hence high-speed data path) TCP data packets.

At step 102, this process 100 then uses the monitored packet information to identify the fastest end user-experienced communication exchanges within the mobile communications network. By one approach, this can comprise not using end user-experienced communication exchanges that have a duration that is less than a predetermined threshold value (such as, for example, no more than about fifty milliseconds). This can prevent the use of information that is likely based upon unhelpful circumstances such as, for example, path mirroring, buffering, or the like.

These steps 101 and 102 can be carried out for every end user's mobile context/session that occurs, in whole or in part, during the predetermined period of time to obtain end user-by-end user data and resolution.

These teachings will optionally accommodate repeating the foregoing steps 101 and 102 as suggested by the phantom line denoted by reference numeral 103. The predetermined periods of time for each repetition can be the same or can vary if desired to accommodate some circumstance of interest. These repeated predetermined period of time can be temporally consecutive (i.e., without any particular break in time or delay) or can be somewhat separated from one another in time as desired.

When repeating these steps 101 and 102 as described, this process 100 will also optionally accommodate the step 104 of providing a plurality of metrics regarding fastest end user-experienced communication exchanges over the corresponding plurality of predetermined-time intervals. By one approach, and particularly when working with results from a plurality of monitoring intervals, this can comprise using volume-weighted averages RTT values (as versus merely using only the fastest RTT) from this plurality of monitoring intervals. Using a volume-weighted approach can help to minimize the effects of low-volume traffic that can occur, for example, when measuring packets that are transported in the low-speed data path (which tend, as mentioned elsewhere, to convey low-volume traffic as versus high-volume traffic) or when measuring, for example, TCP packets during TCP slow start which also tends to represent low-volume traffic.

As another approach in these regards, one could just filter out certain shortest RTT samples before doing a weighted average. This approach takes into account, at least in part, the likelihood that during low-traffic hours, cells that have very low volume will tend to only use low-speed channels. A weighted-average approach on its own would not necessary correct for that circumstance. In that case, it may be better to just place a volume threshold on the sample itself and reject outright the sample having the shortest RTT (as it may be better to have no data than to have bad data).

This reporting of a minimum RTT per interval, of course, serves to minimize the effect of packet serialization delay. This result occurs because the shortest path tends to account for the latency when packets are not being buffered due to serialization delay.

This step 103 can occur as frequently or infrequently as may be desired to suit the given needs of a given application setting.

At optional step 105 this plurality of metrics regarding the fastest end user-experienced communication exchanges over the plurality of predetermined-time intervals are processed to provide at least one latency metric that characterizes at least one minimal (i.e., temporally shortest or fastest) round-trip latency within the mobile communications network. By one approach this can comprise performing a weighted average of the shortest RTT based on the amount of identified TCP downlink delay in each measurement period.

At optional step 106 the network monitoring apparatus then aggregates these latency metrics on a mobile communications network service component-by-service component basis to thereby identify particular service components that unduly contribute to the lengthening of the fastest end user-experienced communication exchanges. For example, these steps can comprise obtaining a minimum measurement from several end users in a same cell where one end user receives only a small volume of data while another end user receives a high volume of data. Though this process can provide for obtaining the minimum RTT for both end users, the information for the high-volume end user can be weighted more highly (or, as suggested above, a minimum-volume threshold can be employed to filter out samples that are unlikely to be helpful because, for example, the network may only be using low-speed data paths during a given monitoring period). Such an approach can aid in removing the influence of performance outliers by proportionally allocating weighting based on volume. This weighted average approach can reduce or eliminate under-sampling effects.

For the sake of illustration more-specific examples in these regards will now be provided. No limitations with respect to the scope of these teachings are intended by way of the specificity of these examples.

Figure 4:
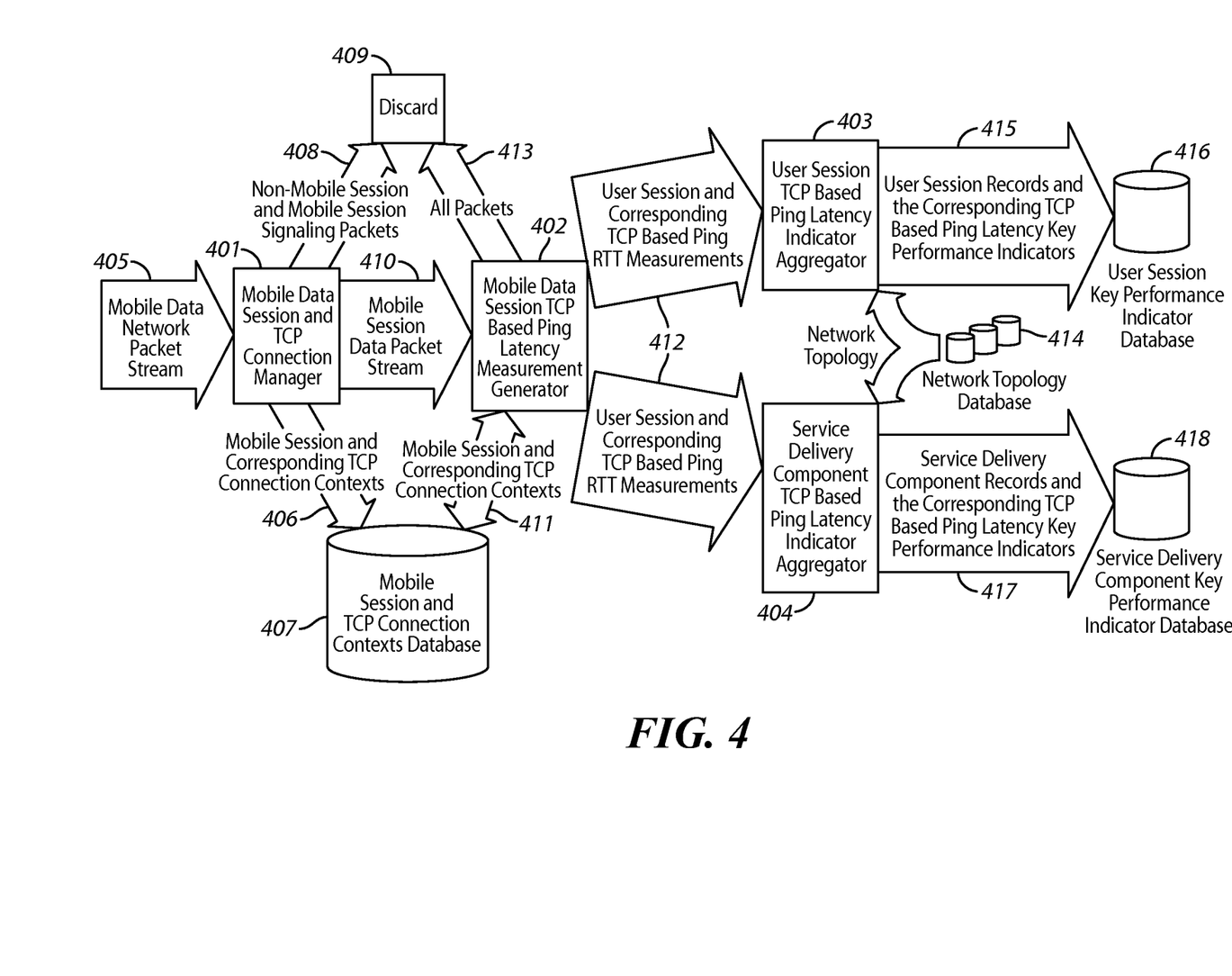
FIG. 4 comprises a component processing diagram as configured in accordance with various embodiments of the invention.

FIG. 4 depicts a component diagram of a network monitoring apparatus configured to function as a TCP-Based Mobile Communication Network High-Speed Radio Channel Latency Monitoring Apparatus that comprises a Mobile Data Session and TCP Connection Manager component 401, a Mobile Data Session TCP-based Ping Latency Measurement Generator component 402, a User/context session TCP-based Ping Latency Indicator Aggregator component 403, and a Service Delivery Component TCP-based Ping Latency Indicator Aggregator component 404.

The Mobile Data Session and TCP Connection Manager component 401 processes a Mobile Network Packet Stream 405 from the mobile communication network to track and manage mobile data session and TCP connections for a reporting interval of each Mobile Data session and its corresponding TCP connections on a per-mobile-data-session basis for every reporting interval. After processing the mobile network packets, this component 401 generates mobile session and the corresponding TCP connection contexts 406 and saves this information in a real-time database 407. In this example non-mobile-session packets and mobile session signaling packets 408 are discarded 409. The remaining mobile session data packets 410 are then passed to the next component 402.

The Mobile Data Session TCP-based Ping Latency Measurement Generator component 402 accesses the mobile session and corresponding TCP connection contexts 411 from the database 407 and processes the Mobile Session Data Packets 410 that were forwarded by the Mobile Data Session and TCP Connection Manager 401 to produce User/context session and corresponding TCP-based Ping Latency Measurements 412 for the next two components 403 and 404. This component 402 then discards 409 all data packets 413 after the aforementioned processing. (It should be noted that, as used herein, the expression "TCP-based Ping Latency" is not to be confused with "ICMP Ping RTT" or "TCP-based RTT" as used in the prior art. Instead, "TCP-based Ping Latency" (as well as "TCP-based Ping RTT") refers to the fastest TCP-based latency measurements through a high-speed channel.)

The User/context session TCP-based Ping Latency Indicator Aggregator component 403 takes these User/context session and the corresponding TCP-based Ping Latency Measurements 412 and cross references a Network Topology Database 414 to produce user/context session records and corresponding TCP-based Ping Latency Key Performance Indicators (KPI) 415. By one approach this comprises a per-user-session view that utilizes an aggregated average TCP Ping RTT that is based on a weighted average of volume of all measurement periods of a user context/session and hence comprises a weighted average of the many fastest RTT periods of a user. These resulting user/context session performance indicators, which include the end-to-end network topology path for that user/context session, are saved in a User/context session Key Performance Indicator Database 416.

The Service Delivery Component (SDC) TCP-based Ping Latency Indicator Aggregator component 404, in turn, takes the User/context session and the corresponding TCP-based Ping Latency Measurements 412 and also cross references the Network Topology Database 414 to produce Service Delivery Component records and corresponding TCP-based Ping Latency Key Performance Indicators (KPI) 417 (including, as appropriate, aggregated TCP-based Ping Latency KPI using the aforementioned volume weighted averages). These resulting service delivery component performance indicators, which include all directly measurable and indirectly derivable service delivery components (handset types, cells, cell sites, network elements, network element's processor units, access point names, server IPs, routers, switches, and so forth) are saved in a User/context session Key Performance Indicator Database 418.

Figure 5:
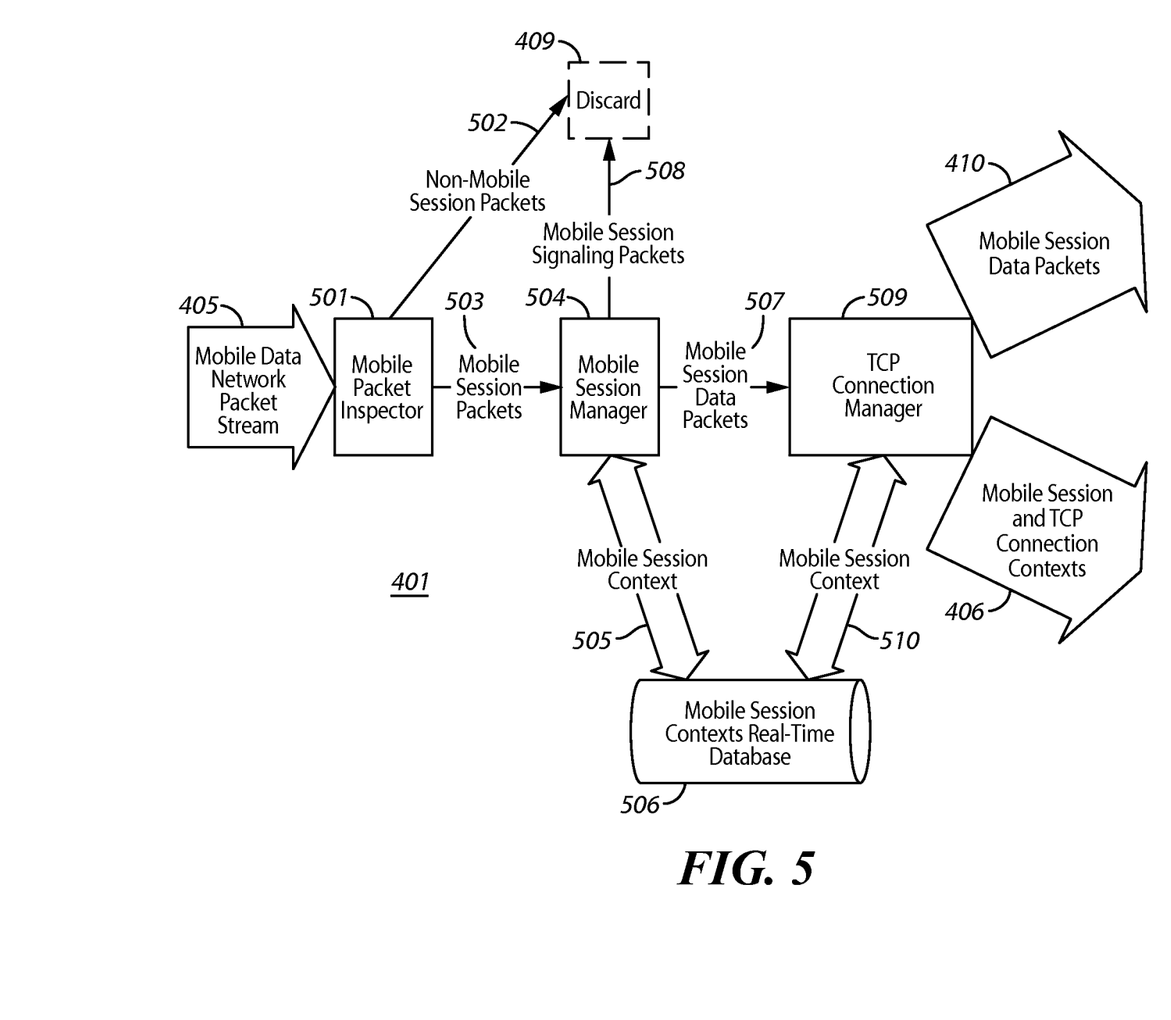
FIG. 5 comprises a processing block diagram as configured in accordance with various embodiments of the invention.

FIG. 5 depicts processing blocks for the aforementioned Mobile Data Session and TCP Connection Manager component 401. A Mobile Packet Inspector 501 receives the aforementioned Mobile Network Packet Stream 405 from the Mobile Data Network. This Mobile Packet Inspector 501 inspects the incoming packet stream 405 and separates this stream into two categories of packets—Non-Mobile Session Packets 502 and Mobile Session Packets 503. As suggested above, the Non-Mobile Session Packets 502 are discarded 409. The Mobile Session Packets 503 are forwarded to a Mobile Session Manager 504 that tracks mobile user/context session states and events.

The Mobile Session Manager 504 creates, updates, or deletes mobile session contexts 505 in a Mobile Session Context Real-time Database 506. Each Mobile Session Context 505 includes mobile session context states (such as, for example, context creation and deletion), events (such as, for example, context updates), and context traffic characteristics (such as, for example, data volumes, context duration, context air time, and so forth). The Mobile Session Manager 504 then forwards only the Mobile Session Data Packets 507 to the next processing entity and discards the Mobile Session Signaling Packets 508 that are not needed any more.

The Mobile Session Data Packets 507 are then processed by a TCP Connection Manager 509 that tracks and manages the TCP-based Ping Latency connections and cross-references them with mobile session context information 510 from the mobile session context real-time database 506. The TCP Connection Manager 509 then passes the aforementioned Mobile Session Data Packets 410 to the next processing component. The TCP Connection Manager 509 also outputs the aforementioned mobile session and TCP connection contexts 406 to the external mobile session and corresponding TCP connection context database 407 shown in FIG. 4.

Figure 6:
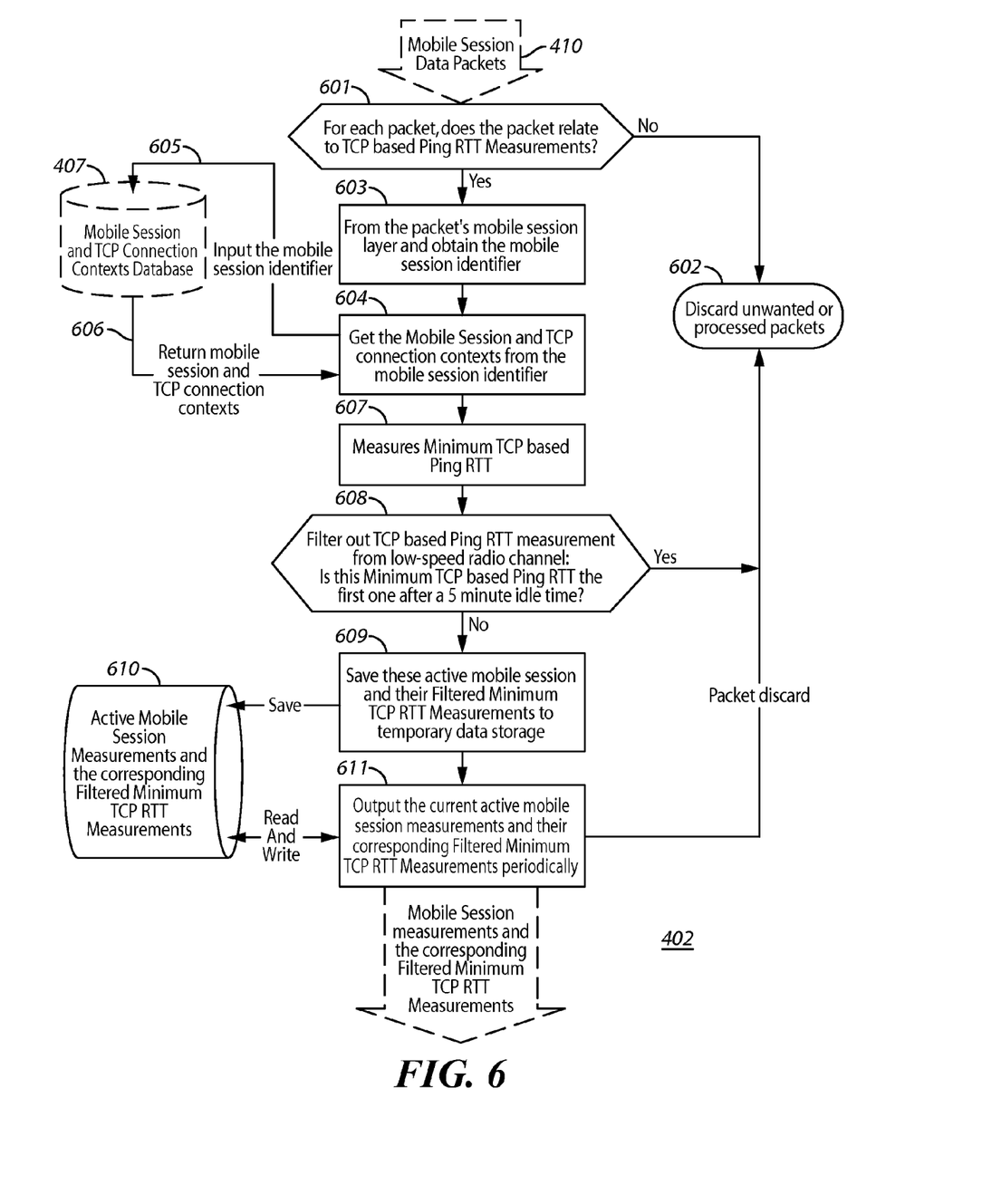
FIG. 6 comprises a flow diagram as configured in accordance with various embodiments of the invention.

FIG. 6 depicts a processing flow of the aforementioned Mobile Data Session TCP-based Ping Latency Measurement Generator component 402. This process begins with receiving Mobile Session Data Packets 410 from the Mobile Data Session and TCP Connection Manager 401 described above. At step 601 this process determines, for each incoming packet, whether the packet relates to one of the TCP based Ping RTT measurements. Packets that fail this assessment are discarded 602. For packets that pass this determination, at step 603 this process retrieves, for each mobile session data packet, the Mobile Session Identifier from the mobile session layer in the mobile session data packet. At step 604 this process inputs 605 the Mobile Session Identifier into the Mobile Session and TCP Connection Contexts Database 407 and retrieves 606 the mobile session and TCP connection contexts.

At step 607 the component processes the Mobile Session Data Packet, the Mobile Session Context, and the TCP Connection Context of a particular mobile data session from the previous step and measures the Minimum TCP based Ping Round-Trip-Time. This process then follows that step 607 with filtering out TCP based Ping RTT measurements from low-speed radio channels. In particular, in this example, this comprises determining whether the Minimum TCP based Ping RTT is a first one following a five minute idle time. If true, the packet is discarded 602. Otherwise, step 609 provides for saving the active mobile's session measurements and their corresponding TCP-based Ping Latency measurements to a temporary data storage 610.

Periodically, such as about every 5 minutes, the current active mobile session measurements and the corresponding TCP-based Ping Latency measurements are accessed from the database 610 and output at step 611 to the next component for aggregation. The processed Mobile Session Data Packets are then discarded 602.

Figure 7:
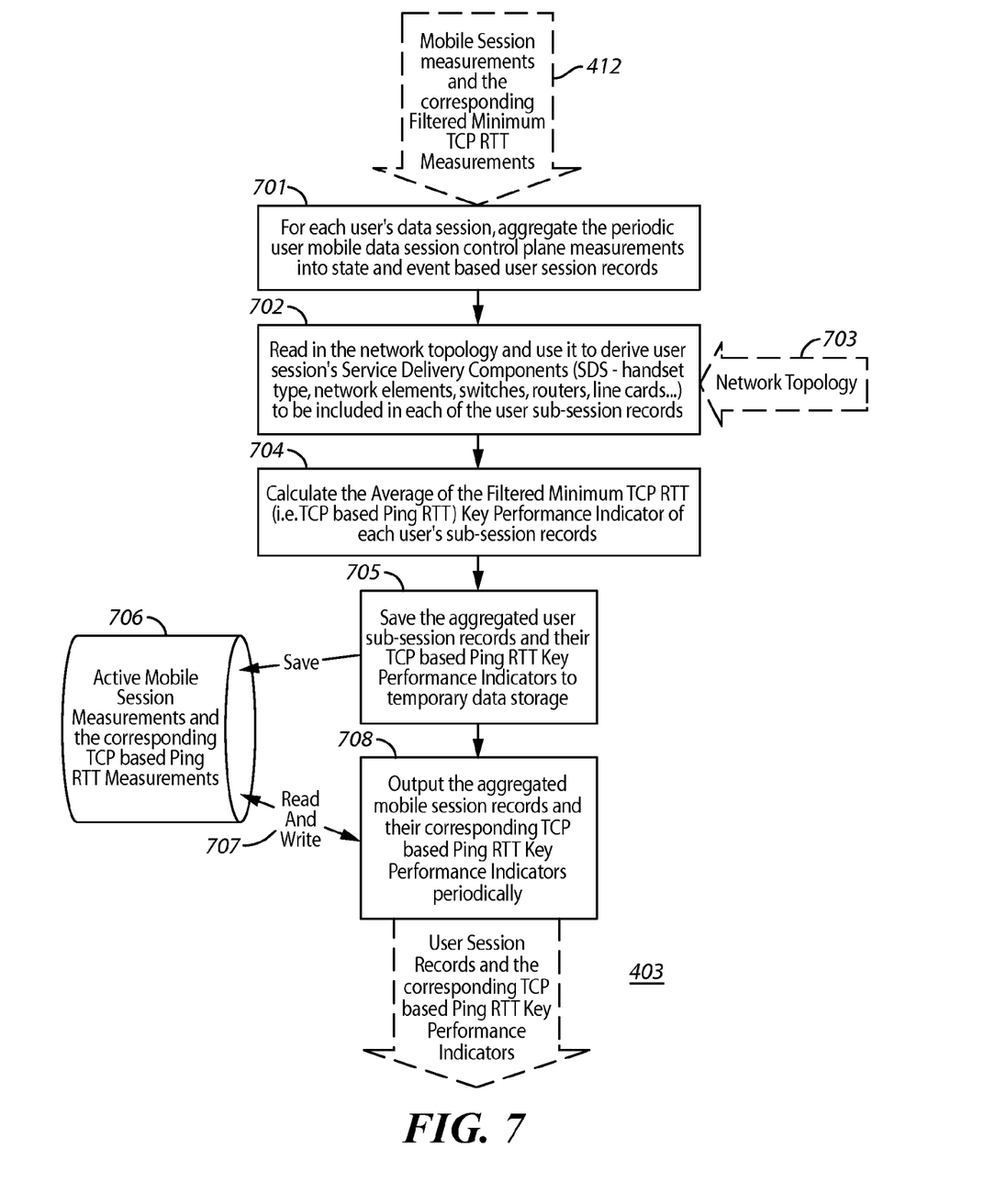
FIG. 7 comprises a flow diagram as configured in accordance with various embodiments of the invention.

FIG. 7 depicts an illustrative processing flow for the aforementioned User/context session TCP-based Ping Latency Indicator Aggregator component 403. This component receives the User/context session and the corresponding TCP-based Ping (i.e., Filtered Minimum TCP RTT) Latency Measurements 412 for multiple reporting intervals from the aforementioned Mobile Session TCP-based Ping Latency Measurement Generator 402.

At step 701, and for each mobile user's session, this component aggregates each user's mobile session control plane measurements of multiple reporting intervals into state and event-based user/context session records. This can comprise, for example, delineating user/context sessions into sub-session records by states or events of the user's mobile activity, such as session volume and session duration, and the user's mobility, such as hand-off from one network element to another network element.

At step 702 the component then reads network topology data 703 and uses that information to derive user/context session service delivery components, such as but not limited to handset type, cell name for the user/context session, network element names, switches, and routers that are in the path of the user's data call. These service delivery components are included in this illustrative example as part of the user sub-session records.

At step 704 this component calculates the Average TCP based Ping RTT Key Performance Indicator (KPI) of each mobile user's data sub-session record (using, for example, the previously-described volume filter and/or volume-weighted averaging). The component then saves (at step 705) the mobile user's sub-session records and their corresponding TCP-based Ping Latency Key Performance Indicators to a temporary data storage 706.

Periodically (such as, for example, every 5 minutes) the current active mobile user sub-session records and their corresponding TCP-based Ping Latency KPIs are read 707 and outputted at step 708 to the next component for aggregation. Outputted user sub-session records can be deleted from the temporary data storage 706. The terminated user/context sessions can have their last sub-session records outputted as well and their last sub-session records can then be deleted from the temporary data storage 706.

Figure 8:
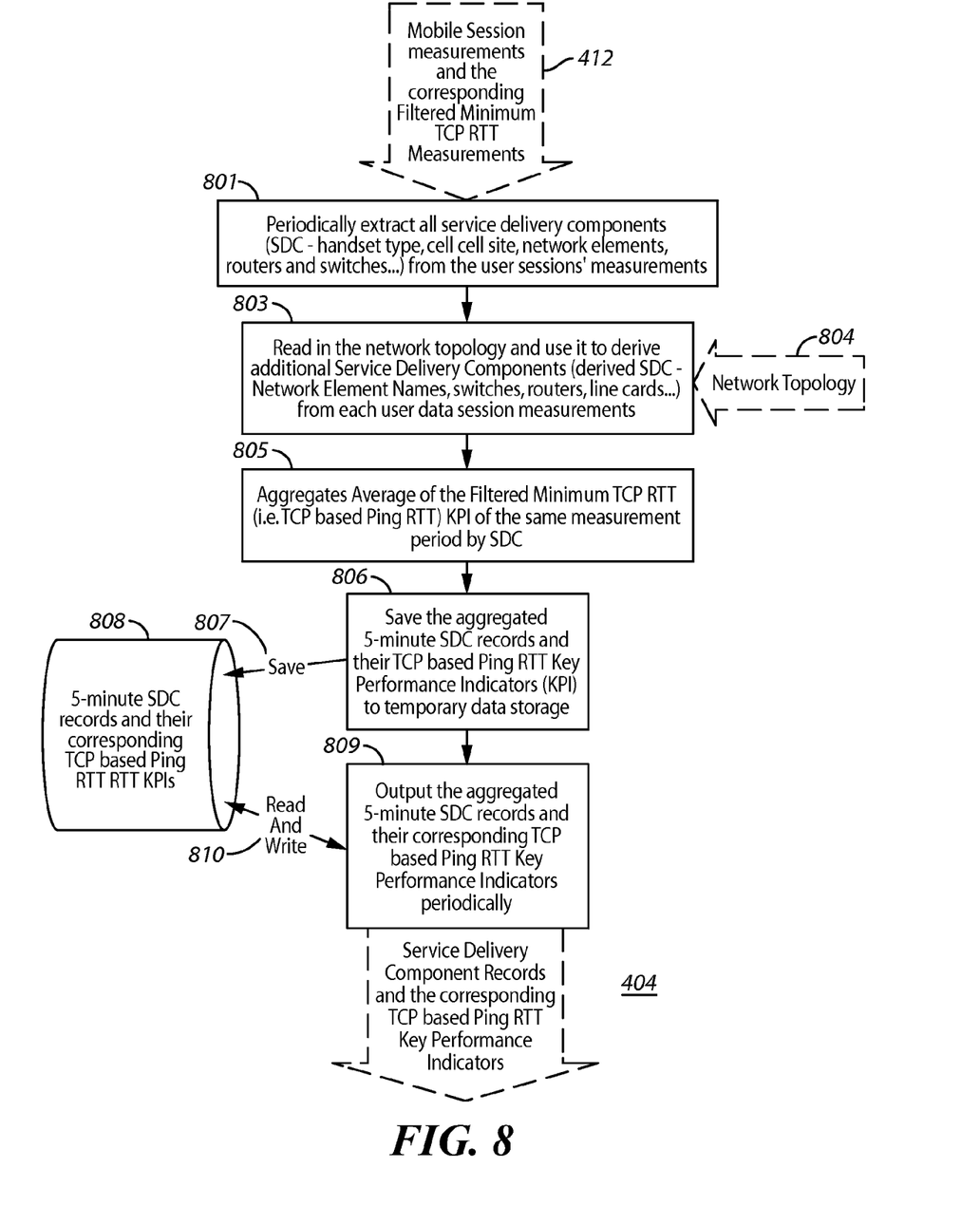
FIG. 8 comprises a flow diagram as configured in accordance with various embodiments of the invention.

FIG. 8 illustrates a processing flow for the aforementioned User/context session TCP-based Ping Latency Indicator Aggregator component 404. This component begins by collecting at step 801 the user sessions and the corresponding TCP-based Ping Latency Measurements 412 of a same measurement interval (for example, every 5 minutes) as output by the aforementioned Mobile Session TCP-based Ping Latency Measurement Generator 402. This component then extracts from all the user/context sessions' records within that time interval the service delivery components in the user/context sessions' records. These service delivery components (SDC) include, for example, handset types, Cell and cell site IDs, Network Element IPs, access point names, server IPs, and other identifiers of network components in the user's session records.

At step 803 this component then reads network topology data 804 and uses that information to derive additional service delivery components and information that was not identified in the previous step 801. These derived service delivery components may include, for example, handset type names, cell and cell site names, network element names, network element line card names, switches and routers that are in the path of the users' data sessions, and so forth.

At step 805 the component then calculates the Average TCP based Ping RTT Key Performance Indicator (KPI) of the SDCs obtained from the foregoing steps. In this illustrative example the underlying data for this SDC-based calculation is from all mobile users' data sessions within the same measurement time interval that are associated with the same SDC. This calculation performs volume weighted averaging (and/or employs a volume-based threshold filter as described above) and produces the associated sessions' Average TCP based Ping RTT into a resulting Averaged TCP based Ping RTT KPI for each SDC.

At step 806 the component saves 807 the periodic per-SDC records and their corresponding TCP-based Ping Latency Key Performance Indicators to a temporary data storage 808. At step 809, then, the component periodically (such as, for example, every 5 minutes) reads 810 the current per-SDC records and their corresponding TCP-based Ping Latency KPIs. Outputted per-SDC records can then be deleted from the temporary data storage 808.

So configured, these teachings provide a unique approach to identifying minimal RTT metrics on a user-by-user and/or service component-by-service component basis that can then serve, in turn, to facilitate identifying service components that are contributing unduly to latency within a mobile communications network. By tending to avoid use of TCP information stemming from low-volume activities (such as those that typify low-speed data paths in a typical mobile communication system) these teachings tend to provide results that are genuinely indicative of genuine latency problems and sources.

These teachings are highly flexible in practice and can be readily scaled to accommodate essentially any size of network or end-user base. These teachings can also be readily implemented in economically favorable ways and in ways that do not further contribute to network traffic or loading.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
 at a network monitoring apparatus in a mobile communications network having both at least one low-speed data path and at least one high-speed data path: monitoring, for a predetermined period of time, Transmission Control Protocol (TCP) packets in the mobile communications network that tend to comprise end-user traffic using the high-speed data path but not the low-speed data path to provide monitored packet information;
 using the monitored packet information to identify fastest end user-experienced communication exchanges within the mobile communications network;
 wherein the predetermined period of time comprises at least three minutes but not more than fifteen minutes.

2. The method of claim 1 wherein the monitoring comprises filtering out end-user traffic that uses the low-speed data path when providing the monitored packet information.

3. The method of claim 1 wherein using the monitored packet information to identify fastest end user-experienced communication exchanges within the mobile communications network comprises identifying the fastest end user-experienced communication exchanges to thereby minimize serialization delay.

4. The method of claim 1 wherein monitoring TCP packets comprises monitoring both synchronization-acknowledgement TCP packets as well as data-acknowledgement TCP packets.

5. The method of claim 1 wherein using the monitored packet information to identify fastest end user-experienced communication exchanges within the mobile communications network comprises not using end user-experienced communication exchanges having a duration that is less than a predetermined threshold value.

6. The method of claim 5 wherein the predetermined threshold value is selected to prevent the use of information that is likely based upon unhelpful circumstances comprising at least one of path mirroring and buffering.

7. The method of claim 1 further comprising:
repeating the monitoring of the TCP packets and the using of the monitored packet information to identify fastest end user-experienced communication exchanges within the mobile communications network to provide a plurality of metrics regarding fastest end user-experienced communication exchanges over a plurality of predetermined-time intervals.

8. The method of claim 7 further comprising:
processing the plurality of metrics regarding fastest end user-experienced communication exchanges over a plurality of predetermined-time intervals to provide at least one latency metric that characterizes at least one minimal round-trip latency within the mobile communications network.

9. The method of claim 7 further comprising:
aggregating the latency metrics on a mobile communications network service component-by-service component basis to identify particular service components that unduly contribute to lengthening of fastest end user-experienced communication exchanges.

10. The method of claim 1 wherein monitoring, for a predetermined period of time, Transmission Control Protocol (TCP) packets in the mobile communications network that tend to comprise end-user traffic using the high-speed data path but not the low-speed data path to provide monitored packet information comprises, at least in part:
monitoring TCP packets that use the high-speed data path and TCP packets that use the low-speed data path to provide initially-monitored data packets;
processing the initially-monitored data packets to tend to retain the TCP packets that use the high-speed data path while tending to discard the TCP packets that use the low-speed data path to provide the monitored packet information.

11. The method of claim 10 wherein processing the initially-monitored data packets to tend to retain the TCP packets that use the high-speed data path while tending to discard the TCP packets that use the high-speed data path to provide the monitored packet information comprises, at least in part, processing the initially-monitored data packets with respect to each measurement period's shortest round-trip time based on that period's volume such that TCP packets that correspond to higher traffic volume tend to be retained.

12. The method of claim 11 wherein processing the initially-monitored data packets with respect to each measurement period's shortest round-trip time based on that period's volume such that TCP packets that correspond to higher traffic volume comprises, at least in part, processing the initially-monitored data packets with respect to each measurement period's shortest round-trip time based on that period's volume for a particular one of:
a given end user;
a given service-delivery component.

13. The method of claim 1 wherein monitoring, for a predetermined period of time, Transmission Control Protocol (TCP) packets in the mobile communications network comprises monitoring the TCP packets at a point of high packet aggregation in the mobile communications network.

14. The method of claim 1 wherein:
monitoring, for a predetermined period of time, Transmission Control Protocol (TCP) packets in the mobile communications network that tend to comprise end-user traffic comprises monitoring each end-user mobile context for the mobile communications network for the predetermined period of time; and
using the monitored packet information to identify fastest end user-experienced communication exchanges within the mobile communications network comprises using the monitored packet information to identify fastest end user-experienced communications exchanges for each of the end-user mobile contexts.

15. An apparatus comprising:
at least one control circuitry; and
memory storing computer program code;
wherein the memory storing the computer program code is configured to, with the at least one control circuitry, cause the apparatus to perform actions comprising:
a network monitoring apparatus in a mobile communications network that has both at least one low-speed data path and at least one high-speed data path, the network monitoring apparatus being configured to:
monitor, for a predetermined period of time, Transmission Control Protocol (TCP) packets in the mobile communications network that comprise end-user traffic using the high-speed data path but not the low-speed data path to provide monitored packet information;
use the monitored packet information to identify fastest end user-experienced communication exchanges within the mobile communications network;
wherein the predetermined period of time comprises at least three minutes but not more than fifteen minutes.

16. The apparatus of claim 15 wherein the network monitoring apparatus is configured to monitor by filtering out end-user traffic that uses the low-speed data path when providing the monitored packet information.

17. The apparatus of claim 15 wherein network monitoring apparatus is configured to use the monitored packet information to identify fastest end user-experienced communication exchanges within the mobile communications network by identifying the fastest end user-experienced communication exchanges to thereby minimize serialization delay.

18. The apparatus of claim 15 wherein network monitoring apparatus is configured to monitor TCP packets by monitoring both synchronization-acknowledgement TCP packets as well as data-acknowledgement TCP packets.

19. The apparatus of claim 15 wherein network monitoring apparatus is configured to use the monitored packet information to identify fastest end user-experienced communication exchanges within the mobile communications network by not using end user-experienced communication exchanges having a duration that is less than a predetermined threshold value.

20. The apparatus of claim 19 wherein the predetermined threshold value is about fifty milliseconds.

21. The apparatus of claim 15 wherein the network monitoring apparatus is further configured to:
   repeat the monitoring of the TCP packets and the use of the monitored packet information to identify fastest end user-experienced communication exchanges within the mobile communications network to provide a plurality of metrics regarding fastest end user-experienced communication exchanges over a plurality of predetermined-time intervals.

22. The apparatus of claim 21 wherein the network monitoring apparatus is further configured to:
   average the plurality of metrics regarding fastest end user-experienced communication exchanges over a plurality of predetermined-time intervals to provide at least one metric that characterizes at least one minimal round-trip latency within the mobile communications network.

23. The apparatus of claim 21 wherein the network monitoring apparatus is further configured to:
   aggregate the metrics on a mobile communications network service component-by-service component basis to identify particular service components that unduly contribute to lengthening of end user-experienced communication exchanges.

* * * * *

UNITED STATES PATENT AND TRADEMARK OFFICE
CERTIFICATE OF CORRECTION

PATENT NO. : 8,605,597 B2  
APPLICATION NO. : 13/788364  
DATED : December 10, 2013  
INVENTOR(S) : Hong et al.

Page 1 of 1

It is certified that error appears in the above-identified patent and that said Letters Patent is hereby corrected as shown below:

ON THE TITLE PAGE:

In column 1 under Related U.S. Application Data [63], please delete "Continuation-in-Part" and insert --Continuation--.

Signed and Sealed this
Fifteenth Day of April, 2014

Michelle K. Lee
*Deputy Director of the United States Patent and Trademark Office*